US010853638B2

(12) United States Patent
Mukhopadhyay et al.

(10) Patent No.: US 10,853,638 B2
(45) Date of Patent: Dec. 1, 2020

(54) SYSTEM AND METHOD FOR EXTRACTING STRUCTURED INFORMATION FROM IMAGE DOCUMENTS

(71) Applicant: Accenture Global Solutions Limited, Dublin (IE)

(72) Inventors: Abhisek Mukhopadhyay, West Bengal (IN); Shubhashis Sengupta, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 145 days.

(21) Appl. No.: 16/173,760

(22) Filed: Oct. 29, 2018

(65) Prior Publication Data
US 2020/0074169 A1 Mar. 5, 2020

(30) Foreign Application Priority Data
Aug. 31, 2018 (IN) .............................. 201841032793

(51) Int. Cl.
*G06K 9/00* (2006.01)
*G06Q 50/18* (2012.01)
*G06Q 40/08* (2012.01)
*G06F 40/279* (2020.01)

(52) U.S. Cl.
CPC ....... *G06K 9/00449* (2013.01); *G06F 40/279* (2020.01); *G06K 9/00456* (2013.01); *G06K 9/00463* (2013.01); *G06K 9/00483* (2013.01); *G06Q 40/08* (2013.01); *G06Q 50/18* (2013.01); *G06K 2209/01* (2013.01)

(58) Field of Classification Search
CPC ............. G06K 9/00449; G06K 9/6201; G06K 9/00463; G06K 9/00456; G06K 9/00483; G06K 2209/01; G06Q 50/18; G06Q 40/08; G06F 40/279; G06F 40/174
See application file for complete search history.

(56) References Cited

U.S. PATENT DOCUMENTS

| 2004/0247168 A1* | 12/2004 | Pintsov | ................ G06K 9/2054 382/137 |
| 2011/0258195 A1* | 10/2011 | Welling | ................... G06K 9/72 707/740 |
| 2013/0297353 A1* | 11/2013 | Strange | .............. G06K 9/00449 705/4 |

(Continued)

*Primary Examiner* — Syed Haider
(74) *Attorney, Agent, or Firm* — Plumsea Law Group, LLC

(57) ABSTRACT

A system and method for extracting structured information from image documents is disclosed. An input image document is obtained, and the input image document may be analyzed to determine a skeletal layout of information included in the input image document. A measure of similarity between the determined skeletal layout and each of the document templates may be determined. A document template may be selected as a matched template, based on the determined measure of similarity. Box areas from the input image document may be cropped out, and optical character recognition (OCR) may be performed on the box areas. Obtained recognized text may be automatically processed using directed search to correct errors made by the OCR. Statistical language modeling may be used to classify the input image document into a classification category, and the classified input image document may be processed according to the classification category.

20 Claims, 10 Drawing Sheets

(56) References Cited

U.S. PATENT DOCUMENTS

| | | | |
|---|---|---|---|
| 2014/0029857 A1* | 1/2014 | Kompalli | G06K 9/00483 382/212 |
| 2015/0347861 A1* | 12/2015 | Doepke | G06K 9/00449 382/199 |
| 2016/0048298 A1* | 2/2016 | Choi | G06Q 30/0267 715/846 |
| 2020/0005258 A1* | 1/2020 | Miller | G06F 40/205 |

* cited by examiner

FIG. 4

- 402 — AUTOMOBILE LOSS NOTICE
- 406 — POLICY #
- CONTACT: NAME, MAILING ADDRESS
- LOSS: LOCATION, POLICE OR FIRE DEPT. CONTACTED, DESCRIPTION
- INSURED VEHICLE: YEAR, MAKE, MODEL
- 410
- Page 1 of 4
- 404
- 408
- 412

FIG. 5

AUTOMOBILE LOSS NOTICE

AGENCY
POLICY #

CONTACT
NAME
MAILING ADDRESS
EMAIL
PHONE | MOBILE

LOSS
LOCATION
POLICE OR FIRE DEPT. CONTACTED
DESCRIPTION

INSURED VEHICLE
YEAR | MAKE | MODEL

Page 1 of 4

SYSTEM AND METHOD FOR EXTRACTING STRUCTURED INFORMATION FROM IMAGE DOCUMENTS

CROSS-REFERENCE TO RELATED APPLICATION

This application claims priority to Indian Provisional Patent Application Number 201841032793, filed Aug. 31, 2018, the disclosure of which is hereby incorporated by reference.

TECHNICAL FIELD

The present disclosure generally relates to extracting structured information from image documents. More specifically, the present disclosure generally relates to a system and method for extracting structured information from form images.

BACKGROUND

Form information extraction systems may automatically extract information from filled forms, so that the information may be processed as needed. For example, in a medical environment, patients may fill in forms that contain fields for personal information such as patient name, address, social security number. Additionally, the forms may contain fields for patients to fill in information regarding their medical insurance, allergies (e.g., allergy to penicillin), current medications, and medical history. In this context, errors made in extracting the information on the forms may lead to errors in treatment, which may adversely affect patients.

Additionally, form extraction systems may be required to process substantially large numbers (e.g., millions or billions) of forms, with time constraints that may be difficult to meet, especially with various requirements on accuracy. For example, in tax season, the U.S. Internal Revenue Service (IRS) may be required to accurately extract information from huge numbers of tax returns, including recognizing various types of forms that may be sent in (e.g., requests for extensions of time, 1040, 1040A), many with payments attached, and many requesting refunds. Inaccurate processing may lead to adverse consequences (e.g., payments not processed, erroneous refund checks issued) for both the government that needs the money, and the individual taxpayers. Moreover, systems that slowly process such forms may not be able to get through all the forms before the next set of returns are due.

Additionally, various versions of forms may be utilized, that may contain the same, or substantially the same, fields for requesting information. Many conventional systems may not recognize variations in forms, and may thus recognize each variation as a different form altogether. More forms may require, at least, more storage and more processing time. When a filled form is processed, more processing time may be needed to search for information regarding which form is being analyzed, and if the filled form is not recognized as one that the system already understands, the filled form may be sent to a human for manual processing, which may result in even more delay in processing, as well as additional expense for additional resources (e.g., human analysts).

Additionally, many conventional systems require manual marking of forms to identify locations on the forms where relevant information is located. Such systems may not be capable of automatically processing forms that are unknown, or that have not been seen before by the system, resulting in further resource consumption, expense of human intervention, and time spent on the manual marking. Further, OCR output may not be intelligently analyzed to correct potential errors.

There is a need in the art for a system and method that addresses the shortcomings discussed above.

SUMMARY

A system and method for extracting structured information from image documents is disclosed. The system and method solves the problems discussed above by intelligently processing input image documents to achieve higher accuracy, in less time than conventional systems. In some embodiments, unsupervised learning techniques may automatically use natural language processing for obtaining an understanding sufficient to automatically annotate and data mine informative fields with an input image document. Such automated annotation may improve the speed and accuracy of extracting relevant information from the image documents.

If a filled form that was previously unseen by the system arrives for processing, the system may intelligently use historical data from previous forms to automatically determine where many standard fields are located on the form, thus saving the time and resources of having a human manually determine where such fields are located. Further, using the historical data learned from previous forms may improve the accuracy of extraction of relevant data by minimizing human error that may be introduced by humans who may not have seen one or more of the previous forms.

Feature vector representations of structures (condensed representations) of unfilled forms and filled forms may be used to match their corresponding structures, which may advantageously reduce the number of computations, in contrast to conventional brute force pixel to pixel matching.

Boxes may be used on the forms to enclose relevant filled information. Using such boxes may advantageously reduce the number of computations required to delineate the filled information from other data in the image document, thereby conserving system resources such as memory and processing resources, as well as substantially reducing the time that may be required to process the filled information. Additionally, the accuracy of the determination of the content of the filled form may be improved, as the boxes provide improved location indicators for the filled information in the image document.

Additionally, semantic analysis of various fields in different forms may be used to determine that the fields represent the same information, thereby improving speed and accuracy in extraction of relevant information.

Results of optical character processing (OCR) may be subjected to post processing using OCR, thus improving the accuracy of the resulting extracted information.

In one aspect, the disclosure provides a method of extracting structured information from image documents, the method comprising: obtaining an input image document; analyzing the input image document to determine a skeletal layout of information included in the input image document; performing matching of the determined skeletal layout against a plurality of document templates to determine a measure of similarity between the determined skeletal layout and each of the document templates; selecting one of the document templates as a matched template, based on a determination that the determined measure of similarity between the determined skeletal layout and the selected document template exceeds a predetermined threshold similarity value; cropping out a plurality of box areas from the input image document, based on a result of the selecting of a matched template; obtaining results of optical character recognition (OCR) on the cropped plurality of box areas, the results including recognized text recognized from image data located within the plurality of box areas in the input image document; automatically processing the obtained recognized text using directed search to correct errors made by the OCR; classifying at least a portion of the recognized text into one or more classification categories using statistical language modeling; providing the classified recognized text to a processor for processing the input image document in accordance with the one or more categories; and generating a report based on a result of the processing of the input image document.

In another aspect, the disclosure provides a non-transitory computer-readable medium storing software that may comprise instructions executable by one or more computers to extract structured information from image documents; obtain an input image document; analyze the input image document to determine a skeletal layout of information included in the input image document; perform matching of the determined skeletal layout against a plurality of document templates to determine a measure of similarity between the determined skeletal layout and each of the document templates; select one of the document templates as a matched template, based on a determination that the determined measure of similarity between the determined skeletal layout and the selected document template exceeds a predetermined threshold similarity value; crop out a plurality of box areas from the input image document, based on a result of the selecting of a matched template; obtain results of optical character recognition (OCR) on the cropped plurality of box areas, the results including recognized text recognized from image data located within the plurality of box areas in the input image document; automatically process the obtained recognized text using directed search to correct errors made by the OCR; classify at least a portion of the recognized text into one or more classification categories using statistical language modeling; provide the classified recognized text to a processor for processing the input image document in accordance with the one or more categories; and generate a report based on a result of the processing of the input image document.

In another aspect, the disclosure provides a system for extracting structured information from image documents, comprising one or more computers and one or more storage devices storing instructions that: extract structured information from image documents; obtain an input image document; analyze the input image document to determine a skeletal layout of information included in the input image document; perform matching of the determined skeletal layout against a plurality of document templates to determine a measure of similarity between the determined skeletal layout and each of the document templates; select one of the document templates as a matched template, based on a determination that the determined measure of similarity between the determined skeletal layout and the selected document template exceeds a predetermined threshold similarity value; crop out a plurality of box areas from the input image document, based on a result of the selecting of a matched template; obtain results of optical character recognition (OCR) on the cropped plurality of box areas, the results including recognized text recognized from image data located within the plurality of box areas in the input image document; automatically process the obtained recognized text using directed search to correct errors made by the OCR; classify at least a portion of the recognized text into one or more classification categories using statistical language modeling; provide the classified recognized text to a processor for processing the input image document in accordance with the one or more categories; and generate a report based on a result of the processing of the input image document.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 4 is a depiction of an example form and a corresponding template according to an embodiment;

FIG. 5 is a depiction of an example form and a corresponding template according to an embodiment;

DESCRIPTION OF EMBODIMENTS

Figure 1:
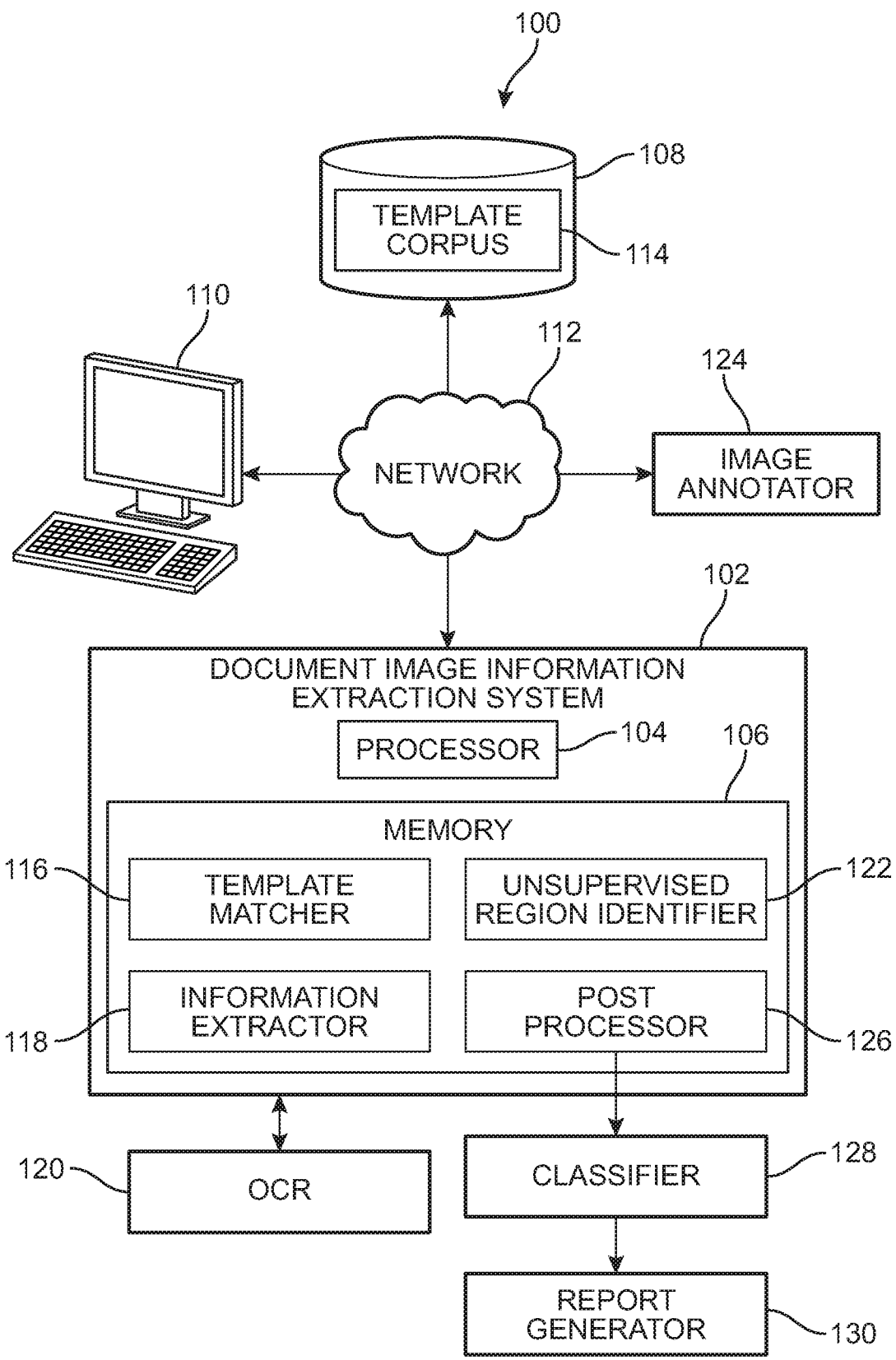
FIG. 1 is a schematic diagram of an embodiment of a system for extracting structured information from image documents.

A system and method for extracting structured information from image documents is disclosed. FIG. 1 shows an embodiment of a document image information extraction system 102. As shown in the embodiment of FIG. 1, the system 102 includes a processor 104 and a memory 106 storing components of the system 102. Processor 104 may include a single device processor located on a single device, or it may include multiple device processors located on one or more physical devices. Memory 106 may include any type of storage, which may be physically located on one physical device, or on multiple physical devices. The system 102 may communicate with a user device 110, for example, to receive user input. For example, the system 102 may communicate with user device 110 via a network 112. In some embodiments, network 112 may be a wide area network ("WAN"), e.g., the Internet. In other embodiments, network 112 may be a local area network ("LAN"). For example, in a more remote location far from a metropolitan area, the Internet may not be available. In yet other embodiments, network 112 may be a combination of a WAN and a LAN.

As shown in FIG. 1, the system 102 may communicate with a repository 108 storing a template corpus 114, for example, to store and retrieve templates representing structures of various types of image documents. For example, the templates may include information representing boxes, and arrangements of the boxes, in image forms.

The system may include several modules. For example, FIG. 1 shows system 102 including a template matcher 116, an information extractor 118, an unsupervised region identifier 122, and a post processor 126. Template matcher 116 may perform matching of a skeletal layout of an input image document against a plurality of document templates (e.g., stored in the template corpus 114) to determine a measure of similarity between the determined skeletal layout and each of the document templates. In some embodiments, the templates are represented as multi-dimensional feature vectors having numerical values in each dimension. Such multi-dimensional feature vectors may be referred to herein as fingerprints. Using fingerprints for comparison with skeletal layouts of documents may reduce the number of computations performed when determining a measure of similarity between the skeletal layout of input image document against document templates. For example, a scanned image with high definition may result in a template image of size 2550×3330 pixels. In this example, a brute force pixel to pixel matching may result in a million computations; however, in some embodiments herein, an example compressed representation (e.g., a seven-dimensional feature vector, or fingerprint) may advantageously reduce the number of computations by an order of 1000. In some embodiments, template matcher 116 may use, at least, computer vision algorithms and line detection algorithms to detect the skeletal structure of the input image document for determining a corresponding fingerprint for the input image document.

As used herein, "fingerprint" refers to a structural representation of the image document (e.g., a form) that is independent of the textual content. In example embodiments, the fingerprint of one template differs from the fingerprint of other templates (i.e., fingerprints are unique among the templates). As discussed further herein, the fingerprint may be represented in condensed form as a multiple dimensional vector that corresponds to an image version (e.g., a fingerprint image or template image). As used herein, "structured information" refers to information that is structured by its placement in various fields in the input image document.

Information extractor 118 may extract relevant information from the input image document, using a template that is selected as a result of the matching. In some embodiments, a plurality of box areas may be cropped out from the input image document, based on a result of the selecting of a matched template. For example, using boxes to enclose relevant filled information in forms may advantageously reduce the number of computations required to delineate the filled information from other data in the image document, thereby conserving system resources such as memory and processing resources, as well as substantially reducing the time that may be required to process the filled information. Additionally, the accuracy of the determination of the content of the filled form may be improved, as the boxes provide improved location indicators for the filled information in the image document.

The plurality of box areas may be provided to optical character recognition (OCR) 120 to determine text included within the plurality of box areas in the input image document. For example, OCR 120 may determine text in box-delineated fields of an input image of a filled form. Examples of OCR that may be used may include, at least, TESSERACT (licensed by APACHE, backed by GOOGLE) and ABBYY FINEREADER.

Unsupervised region indicator 122 may automatically determine regions in the input image document where relevant information may be located, based on a determination that no templates match the input image document (e.g., based on a determined similarity measure that fails to exceed a predetermined threshold value). In some embodiments, unsupervised region indicator 122 may provide indicators showing where on the input image document the determined regions are located, and an image annotator 124 may generate an annotated version of the input image document, and store the annotated version in template corpus 114. For example, image annotator 124 may provide a display of the indicators indicating locations of the determined regions, and a user at user device 110 may manually provide annotations, which may then be stored with the input image document (e.g., in the form of an annotated image document) in template corpus 114.

Post processor 126 may automatically process the recognized text. In some embodiments, post processor 126 may correct OCR errors. For example, post processor 126 may utilize a list of historical OCR errors to infer errors that may have been introduced in the current recognized text. For example, it may be a common OCR error to recognize an input "B" as an "8". Thus, an input such as "Better" may be recognized as "better". As another example, it may be a common OCR error to confuse numeric zero and alphabetic "O," such that an input of "Hello" may be erroneously recognized as "Hell0." Post processor 126 may correct such errors by using an English Language Model. In some embodiments, post processor 126 may use historical data and/or one or more language models (e.g., using statistical language modeling) to enforce common sense in the extraction of the information. In contrast to spell corrector techniques, post processor 126 may be biased toward correcting OCR errors, which are different from human spelling errors. In some embodiments, post processor 126 may be configured to enforce user defined constraints to ensure correctness of the OCR output. For example, such constraints may be input by users as parameters, or rules, for use by post processor 126 during execution. In this way, the accuracy of the resulting extracted information may advantageously be improved.

As another example, a vehicle identification number (VIN) may include seventeen characters. An OCR operation may be able to accurately recognize only a subset of the characters. Post processor 126 may use checksums to determine a more accurate VIN, based on the result of OCR 120. In some embodiments, post processor 126 may use a directed search, for example, by using a list of historical OCR errors. In this way, post processor 126 may be tuned to ensure that OCR errors may be corrected to conform with user expectations and common sense.

A classifier 128 may classify the processed text (and associated input image document) into one or more classification categories. In some embodiments, classifier 128 may use natural language processing to classify the processed text. For example, if the input image document includes an image of a filled insurance form, the processed text may be analyzed to determine a description of an accident. In some embodiments, the description of the accident may provide information for classifying the input image of the filled form. For example, a user may provide one hundred main classes for classification of accidents. Classifier 128 may use natural language processing to analyze a description of the accident to determine which classification is appropriate for that particular description, for that particular input image form. As an example, a FAST-TEXT technique may be used to tag the extracted description information to determine a type of loss corresponding to the description. FASTTEXT is a library for learning of word embeddings and text classification created by an artificial intelligence (AI) Research lab of FACEBOOK. The model of FASTEXT includes an unsupervised learning technique for obtaining vector representations for words. Once classified, a report generator 130 may generate a report using different input fields from the associated form, and/or from different forms.

In some embodiments, system 102 may transfer learned information from older forms that were actually input into system 102 in the past, so that different users of the information may be determined. For example, it may be detected that forms may model the different fields of standard documents in a certain number of ways. As one example, one form may label a key field as "Name of Insured," while another form may label the same key field as "Insured Name." System 102 may perform a semantic analysis of these fields to advantageously determine that they represent the same information. For forms that provide boxes for input fields, the boxes may be cropped out and provided to OCR 120 for processing, to obtain potential content for analysis. For example, if a key (e.g., "Name of Insured") is located at a top portion, the key may be extracted. For this example, an actual name of an insured may be determined as the value of this box. In some embodiments, system 102 may determine the key by using different features, such as language used, position, alignment, etc. In some embodiments, a rule may be used to differentiate the key from other information.

In some embodiments, if there exists more than one instance of a particular form, system 102 may compare multiple forms to determine invariant regions. An invariance of use of a particular key in invariant regions across the multiple forms may be utilized to classify the key. As discussed above, language modeling may be used to recognize that different names may be used to identify the same key (e.g., "Name of Insured") for a particular position in a form.

In some embodiments, such redundancy across forms may provide high accuracy for "one-shot" learning by using a semantic matching technique (e.g., based on a semantic algorithm). In contrast to syntactical similarity, "semantic matching" refers to matching based on meanings of terms. In some embodiments, when only a single instance of a previously unseen format is input into the system, the form may be matched against all the templates in the system. If the match score is not sufficiently high, a one-shot learning mechanism may be used ("one-shot" referring to the system having only one example from which to learn). As discussed further herein, candidate region identification may be performed. For example, the system may use computer vision to identify candidate locations where pertinent information may be present (e.g., rectangles in the image that contain textual data).

In some embodiments, once the candidate location is identified its textual content may be segmented into two clusters. The two clusters may be independently analyzed based on features such as actual textual content, location, font boldness, etc., to classify one cluster as the "Key" and the other as the "Value." In this context, the "Key" text may be used to determine what information is contained in the box. In some embodiments, the key may be semantically matched against the language model of various relevant keys (e.g. the knowledge derived from the old forms). For example, the language model of a standard field such as "Insured Name" may include variations such as "Name of Insured", "Insured Contact Name", "Name of person Insured," etc. This type of matching may be referred to as "semantic matching," as it is not a literal letter by letter match, and synonyms can also be detected by the model.

Thus, for input forms not previously seen by system 102, knowledge previously learned for particular regions across multiple forms may be used (e.g., by unsupervised region identifier 122), and if nothing is found, then the input form may be sent to a user for manual marking. For example, such processing may be performed as backend processing.

In some embodiments, a set of forms may be collated with each other, and it may be determined that only key regions are consistent across the forms (e.g., name, age, VIN fields are all located in the same, or substantially the same, locations in the different forms). In this context, "substantially the same" refers to a condition of being exactly the same, or within a predetermined threshold value of minor variance from each other. In some embodiments, system 102 may keep the consistent information and remove other information to obtain a model form for identifying candidate data automatically. Once the model form is approved, it may be annotated and stored with structural images of the forms, or fingerprint images (i.e., in template corpus 114) for handling future instances of the same form type. In this example, system 102 may be automatically trained to handle standard forms, with manual input for obtaining annotations.

Figure 2:
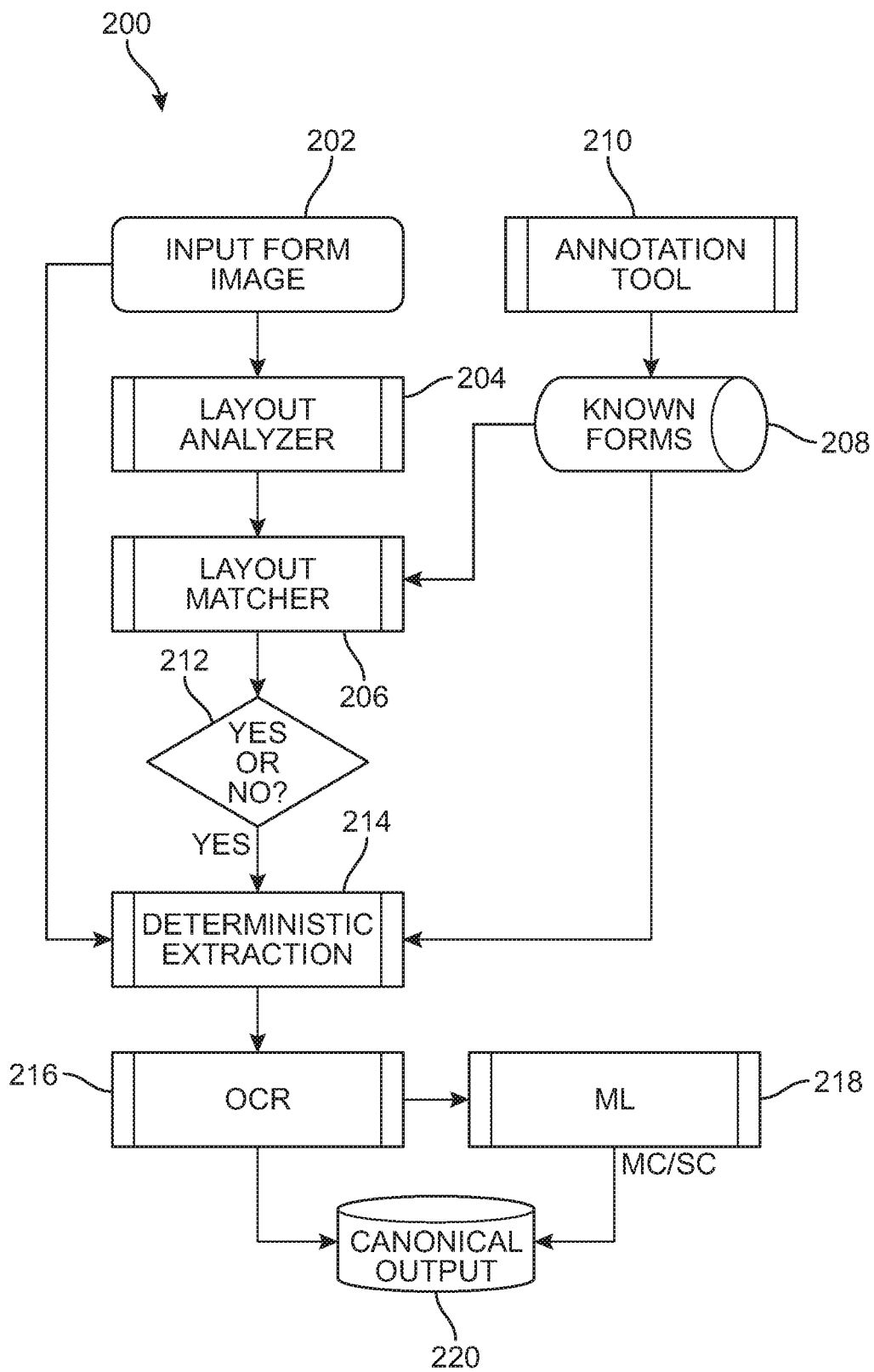
FIG. 2 is a schematic diagram of an embodiment of a system for extracting structured information from image documents whose structure is known.

FIG. 2 is a schematic diagram of an embodiment of a system for extracting structured information from image documents whose structure is known. As shown in FIG. 2, an input form image 202 may be obtained and provided to a layout analyzer 204, which may analyze input form image 202 to determine a skeletal structure of input form image 202. A corresponding template and fingerprint may be determined for input form image 202.

A layout matcher 206 may perform matching between the determined fingerprint and fingerprints from a known forms repository 208. For example, known forms repository 208 may store known forms and templates, similarly as discussed above with regard to repository 108 storing the template corpus 114. For example, layout matcher 206 may perform matching similarly as discussed above with regard to template matcher 116. An annotation tool 210 may obtain annotations for forms. In some embodiments, annotation tool 210 may be used to mark and store informative form locations offline. For example, informative form locations may include locations for fields such as name, address, social security number, etc. In some embodiments, a user interface may be used to display form information to a user, and to receive user input for the annotations. In some embodiments, the annotations may be determined automatically.

In some embodiments, layout matcher 206 may determine a measure of similarity between the determined fingerprint and each of the fingerprints from known forms repository 208. At 212, if the measure of similarity exceeds a predetermined threshold value, then deterministic extraction 214 may extract relevant information from filled fields of input form image 202. For example, deterministic extraction 214 may perform operations similarly as information extractor 118 discussed above.

As shown in FIG. 2, in cases where the input form is known (e.g., when input form image 202 is received), input form image 202 may be directly provided to deterministic extraction 214. For example, known forms 208 may store previously annotated forms, and such annotations may provide information for accurately determining locations, on input form image 202, of values for certain keys. Thus, it may not be necessary to analyze the layout of such forms and perform matching, as the locations of certain fields is already stored in known forms 208. In this way, system 202 may advantageously reduce the amount of processing required to determine portions of input form image 202 for further processing.

An OCR 216 may determine text included within a plurality of box areas in input form image 202, similarly as OCR 120 discussed above. For example, OCR 216 may determine text in box-delineated fields of an input image of a filled form.

OCR 216 may provide output to machine learning 218, and/or may provide output as canonical output 220. Machine learning 218 may process results of OCR 216 processing to correct OCR errors as discussed above, and may determine meanings associated with text output from OCR 216. Machine learning 218 may provide output as canonical output 220. As used herein, "canonical output" refers to a uniform formatting for presenting information content from within a form image, irrespective of any differences in form formats. In some embodiments, the "canonical output" includes a standard relational table that may be generated to present the extracted information to downstream processes.

Figure 3:
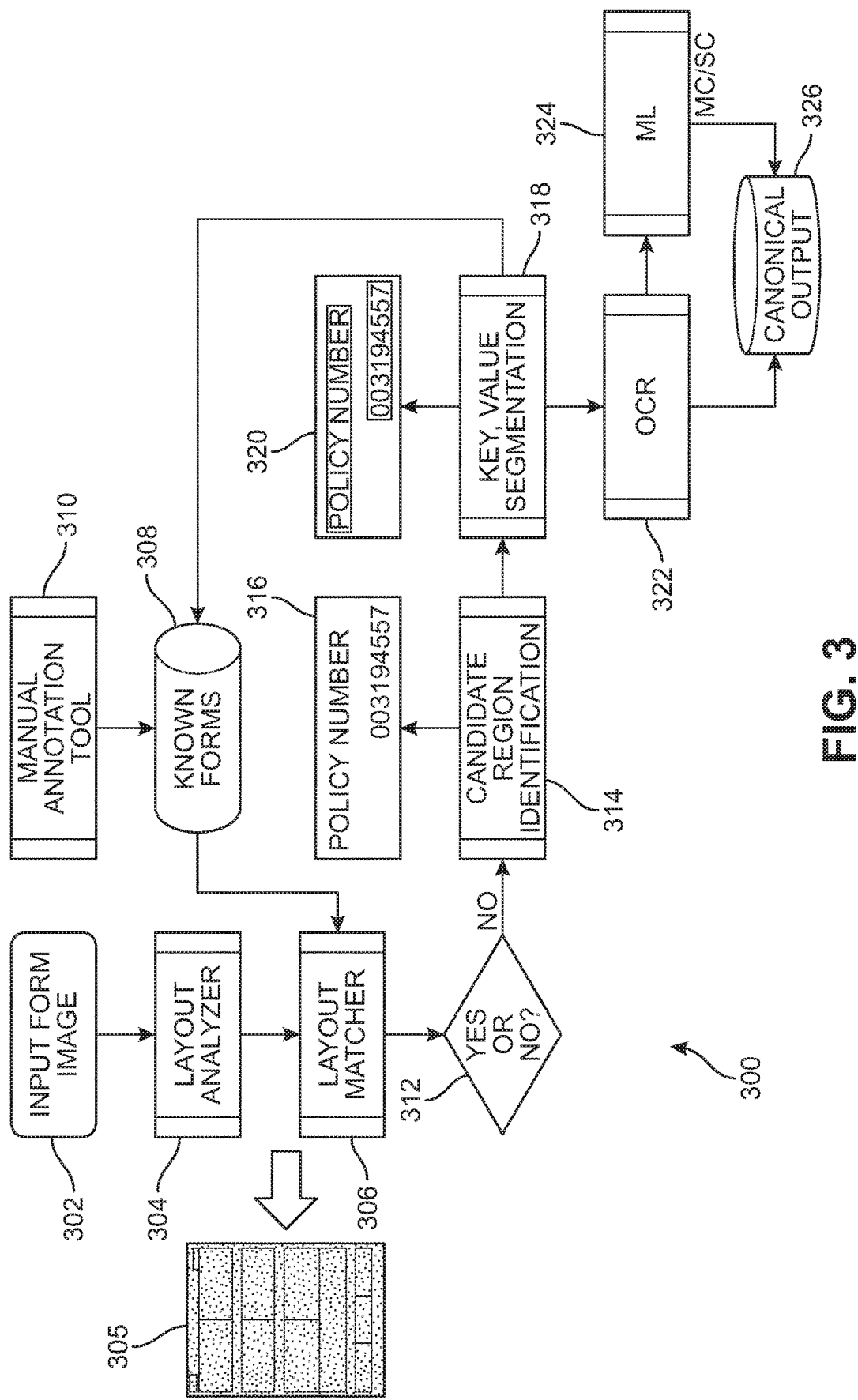
FIG. 3 is a schematic diagram of an embodiment of a system for extracting structured information from image documents whose structure is unknown.

FIG. 3 is a schematic diagram of an embodiment of a system for extracting structured information from image documents whose structure is unknown. For example, a type of form may not have been previously seen by a system for processing forms. As shown in FIG. 3, an input form image 302 may be obtained and provided to a layout analyzer 304, which may analyze input form image 302 to determine a skeletal structure of input form image 302. A corresponding template 305 and fingerprint may be determined for input form image 302. For example, layout analyzer 304 may advantageously extract a content independent layout structure from form image 302 as a type of fingerprint for an improved matching technique (e.g., to improve accuracy in matching input forms to known forms). In some embodiments, the template 305 may be used to generate a condensed representation that includes a vector of a plurality of real number values, which may be used for comparison with vectors representing the known forms. For example, a Euclidean distance metric may be used on the vector representations to quickly determine distances between the structure of input form image 302 and each structure of the known forms, thus determining a similarity measure (e.g., smaller distances infer greater similarity measures).

A layout matcher 306 may perform matching between the determined fingerprint and fingerprints from a known forms repository 308. For example, known forms repository 308 may store known forms and templates, similarly as discussed above with regard to repository 108 storing the template corpus 114. For example, layout matcher 306 may perform matching similarly as discussed above with regard to template matcher 116. For example, a Euclidean distance metric may be used on the vector representations to quickly determine distances between the structure of input form image 302 and each structure of the known forms, thus determining a similarity measure (e.g., smaller distances infer greater similarity measures).

A manual annotation tool 310 may obtain annotations for forms. In some embodiments, manual annotation tool 310 may be used to mark and store informative form locations offline (e.g., in repository 308). For example, informative form locations may include locations for fields such as name, address, social security number, etc. In some embodiments, a user interface may be used to display form information to a user, and to receive user input for the annotations. In some embodiments, the annotations may be determined automatically.

In some embodiments, layout matcher 306 may determine a measure of similarity between the determined fingerprint and each of the fingerprints from known forms repository 308, and if the measure of similarity exceeds a predetermined threshold value (312), then candidate region identification 314 may analyze the layout image (e.g., template 305) to retrieve candidate locations of various form fields. Candidate region identification 314 may automatically determine, as candidate regions, independent blocks on a form (i.e., simple boxes with no further boxes within them) where textual information is present within the form. In some embodiments, solid bounded boxes where text is present may indicate locations where key, value information 316 is present (e.g., solid bounding boxes printed on the original form that was filled prior to scanning into the input form image 302). In the example shown in FIG. 3, key, value information 316 within a bounding box may include a key "policy number" having a value "003194557," thus forming the key, value pair ('policy number', '003194557'). For example, the location 316 may have been previously annotated by manual annotation tool 310.

As shown in FIG. 3, key, value segmentation 318 may separate the area having the key from the area having the value of the key. In some embodiments, key, value segmentation 318 may detect independent text units in a candidate region, and classify the detected text units as either keys or values, based on features such as actual text, relative positioning, etc. For example, key, value segmentation 318 may extract the key, value pair from input form image 302 as separate boxes 320, which may be provided to an OCR 322 for text recognition. OCR 322 may determine text included within a plurality of box areas in input form image 302, similarly as OCR 120 discussed above. For example, OCR 322 may determine text in box-delineated fields of an input image of a filled form.

In some embodiments, the layout image and the determined key, value locations (e.g., identified key, value region) may be stored in known forms 308 storage for future use for future input form images 302 (as shown in FIG. 3).

OCR 322 may provide output to machine learning 324, and/or may provide output as canonical output 326. Machine learning 324 may process results of OCR 322 processing to correct OCR errors as discussed above, and may determine meanings associated with text output from OCR 322. Machine learning 324 may provide output as canonical output 326. In some embodiments, a language model utilized by machine learning 324 may capture variations in the key text. For example, variations such as "Insured Name" and "Name of Insured" as keys for a name may be captured and determined as variations for the same key in different forms. Since many forms may provide such fields in the same regions, or substantially the same regions (i.e., less than a predetermined threshold value in distances between locations in different forms), in different forms, the system may store such location information, with information regarding variations of the key text, for future form processing.

Example embodiments discussed herein may automatically extract relevant information from forms having complex layouts. In some embodiments, the information may be extracted from forms with boxes drawn around fillable regions. In a typical sample of forms, it may be observed that approximately 80% of the forms may have low variability, in the sense that they are filled versions of a relatively smaller number of standard formats.

For example, in the domain of Auto Insurance First Notice of Loss Forms, it may be observed that approximately 10-12 formats make up the bulk of the samples. For example, ACORD provides standard forms used by the insurance industry. Example techniques discussed herein may advantageously ensure that there is minimum error for the known high-volume formats, which may be referred to as "templates" herein.

For a known format, locations of relevant information may be known. Example techniques discussed herein may use examples of standard templates to train an unsupervised machine learning system that suggests the location of relevant information to be validated and corrected (if needed) by the user. Once the annotation process is complete (e.g., via image annotator 124), the annotations (e.g., coordinate information of relevant information) may be stored in association with the template type (e.g., in repository 108). Once this templatization is completed for the high volume formats, incoming forms may be matched against the templates (e.g., via template matcher 116).

In some embodiments, a matching strategy may advantageously generate a compressed representation that encodes the structural and layout information of the form (e.g., the fingerprint). Example techniques discussed herein may advantageously ensure that the matching is robust against minor noise, and that the matching is performed in real time.

In some embodiments, the fingerprint image may be generated from a single scanned form image in accordance with:

Step 1: Convert the input image to grayscale.

Step 2: Apply thresholding on the grayscale image to adaptively threshold it into a binary image. For example, Otsu's thresholding may iterate through all the possible threshold values and calculate a measure of spread for the pixel levels each side of the threshold, i.e., the pixels that either fall in the foreground or the background of the image. A goal is to determine the threshold value where the sum of foreground and background spreads is minimized.

Step 3: Invert the binary image.

Step 4: Detect the dominant lines in the inverted image (e.g., utilizing a line segment detector provided by OPENCV).

Step 5: Filter the lines detected to retain only the nearly horizontal and vertical lines within the image (e.g., within a predetermined threshold of "horizontal" and "vertical").

Step 6: Redraw the retained lines on a blank image of the same size as the form image.

Step 7: Apply morphological operations on the blank image to make broken lines continuous. Broken lines may appear due to scanning issues.

In some embodiments, other line segment detectors may be used, such as Hough Line Transform, and/or morphological operations with horizontal/vertical structuring elements. As explanation, binary images may contain numerous imperfections. In particular, the binary regions produced by simple thresholding may be distorted by noise and texture. Morphological image processing pursues the goals of removing these imperfections by accounting for the form and structure of the image. For example, morphological image processing may include a collection of non-linear operations related to the shape or morphology of features in an image. For example, morphological operations rely only on the relative ordering of pixel values, not on their numerical values, and therefore may advantageously be especially suited to the processing of binary images.

In some embodiments, following the generation of the fingerprint image, the two-dimensional binary fingerprint image may be converted into a dense seven-dimensional vector, which may be referred to as a feature representation, or a feature vector. In this way, seven real numbers may be stored for each template, advantageously avoiding a need to store all the template images in memory, making the system highly memory efficient. One of skill in the art will understand that feature vectors are not limited to seven dimensions, but may have more or fewer dimensions, to achieve the functionality discussed herein.

In some embodiments, during the process of matching an incoming document with the templates, the incoming form image may be processed and its fingerprint image extracted. The fingerprint image may then be converted into a dense feature vector, and a measure of similarity may be determined by determining the Euclidean distance of the generated feature vector from the feature vectors of each of the templates. Templates whose feature vector is less than a predetermined threshold value distance from the generated feature vector may be determined as being sufficiently similar to the incoming form image, and may be determined as a match to the form image.

The feature representation may encode the layout information and the overall structure of the fingerprint image into the features. For example, Hu Moments may be used as the feature representation.

Hu Moments are generally used to describe, characterize, and quantify the shape of an object in an image. Hu Moments are normally extracted from the silhouette or outline of an object in an image. By describing the silhouette or outline of an object, a shape feature vector (i.e., a list of numbers) may be extracted to represent the shape of the object, a similarity of two shapes may then be determined by comparing their shape feature vectors. For example, a similarity measure of two feature vectors may be determined using a Euclidean distance function to determine the Euclidean distance between the two feature vectors. One of skill in the art will understand that metrics other than Euclidean distance (e.g., Cosine distance) may also be used to determine measures of similarity. One of skill in the art will understand that feature representations other than Hu Moments may also be used. For example, BRIEF (Binary Robust Independent Elementary Features) and SURF (Speeded-Up Robust Features) are other feature extractors that may be available from OPENCV.

FIG. 4 is a depiction of an example form and a corresponding template according to an embodiment. As shown in FIG. 4, an automobile loss notice form 402 may be processed to generate a corresponding template 404 which represents the structure of the form without text. For example, the layout analyzer 304 may process the form 402 to generate the corresponding template 404 which represents the structure of the form without text. More particularly, corresponding template 404 stores information regarding locations of line-delineated boxes on form 402. For example, a box 406 on form 402 may be represented as a box 408 in corresponding template 404 (e.g., for a location of relevant text information regarding a policy number). As another example, a box 410 may be represented as a box 412 in corresponding template 404 (e.g., for a location of a description associated with a loss). In some embodiments, the relevant text information for this form field may be analyzed to categorize the input form. For example, a windshield breakage description may be determined as categorized into a first category, while a rear end collision description may be determined as categorized into a second category, for downstream processing/reporting in accordance with the different categories. As discussed above, computer vision algorithms and line detection algorithms may be used to detect the skeletal structure (e.g., template 404) of the input image document (e.g., form 402).

FIG. 5 is a depiction of an example form and a corresponding template according to an embodiment. As shown in FIG. 5, an automobile loss notice form 502 may be processed to generate a corresponding template 504 which represents the structure of the form without text. As can be seen in the example of FIG. 5, a box 506 on form 502 may be represented as a box 508 in corresponding template 504 (e.g., for a location of relevant text information regarding the policy number). As another example, a box 510 may be represented as a box 512 in corresponding template 504 (e.g., for a location of a description associated with a loss). A comparison of FIG. 4 and FIG. 5 shows that each form contains (at least) a policy number field and a description field, that is, fields that are common across multiple forms (e.g., two variations of the same form). However, in these examples, the common fields are located in different locations, but in almost the same regions of the two forms. Such information may be stored as historical information for processing future input forms for faster, more efficient processing of the future forms, including forms that have not been seen by the system prior to their future input.

Figure 6:
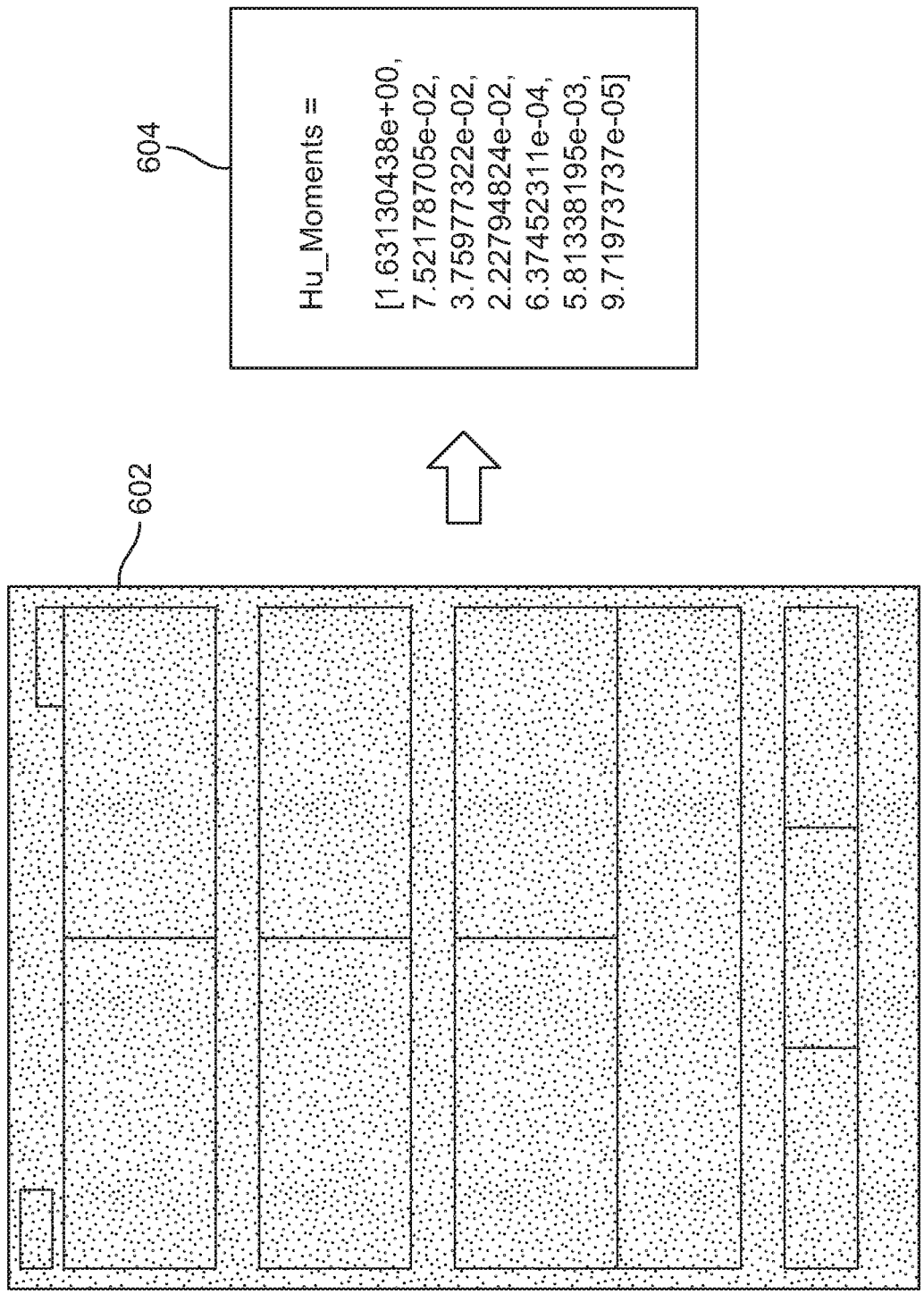
FIG. 6 is a depiction of an example template and a corresponding condensed representation of the template according to an embodiment.

FIG. 6 is a depiction of an example template and a corresponding condensed representation of the template according to an embodiment. As shown in FIG. 6, a template 602 may be analyzed to determine a corresponding condensed representation 604 of the template 602. For example, the layout analyzer 304 may generate corresponding condensed representation 604 of the template 602. As discussed above, condensed representation 604 may be represented as a feature vector, indicated in FIG. 6 as Hu moments. As discussed above, such vectors may advantageously be used to conserve memory and processing resources to store the structural representations of forms, as well as to efficiently determine similarities between input forms and previously stored templates.

Figure 7:
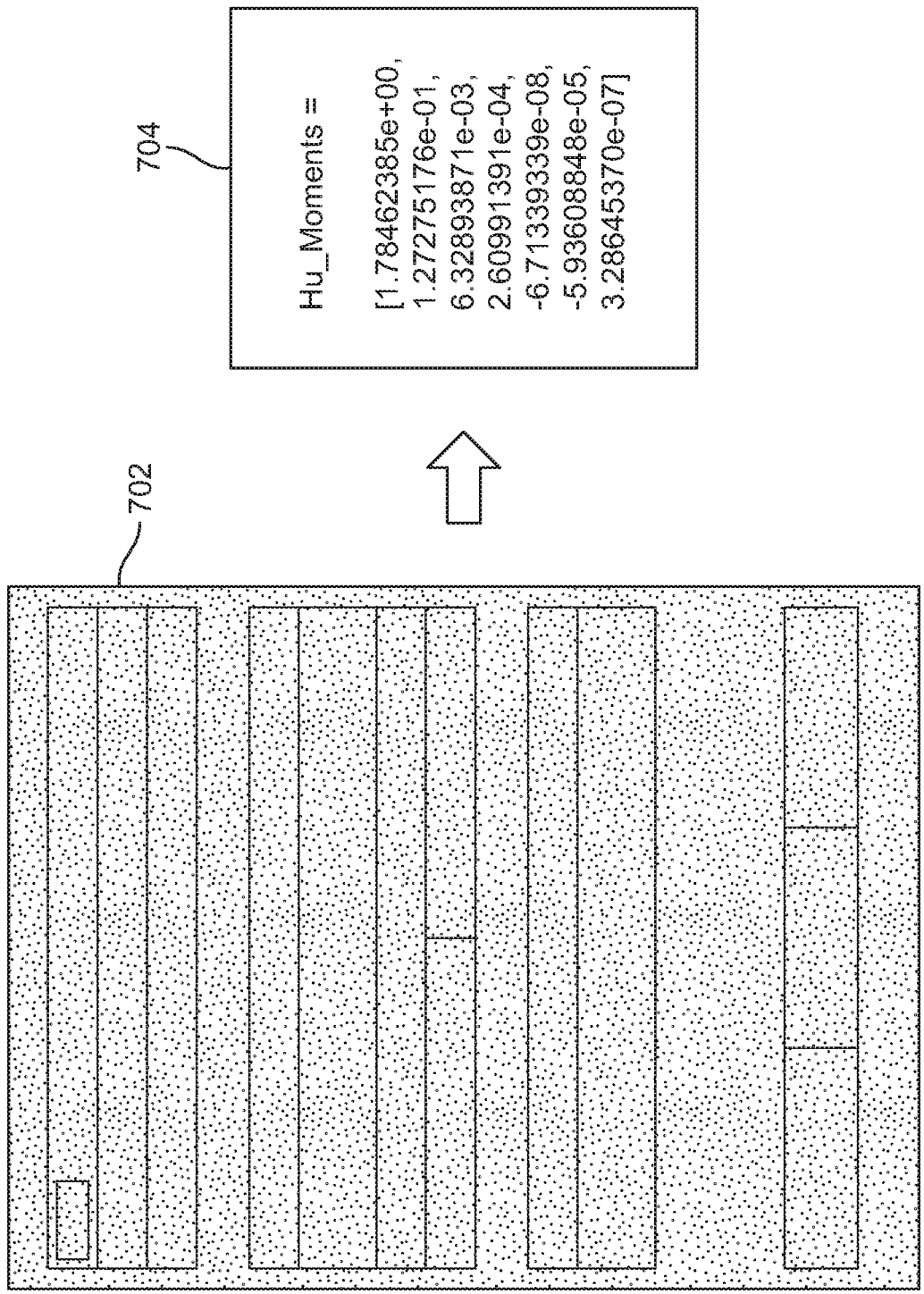
FIG. 7 is a depiction of an example template and a corresponding condensed representation of the template according to an embodiment.

FIG. 7 is a depiction of another example template and a corresponding condensed representation of the template according to an embodiment. As shown in FIG. 7, a template 702 may be represented as a corresponding condensed representation 704 of the template 702. As can be readily seen, template 602 is different from template 702, as are their associated corresponding condensed representations 604 and 704.

Figure 8:
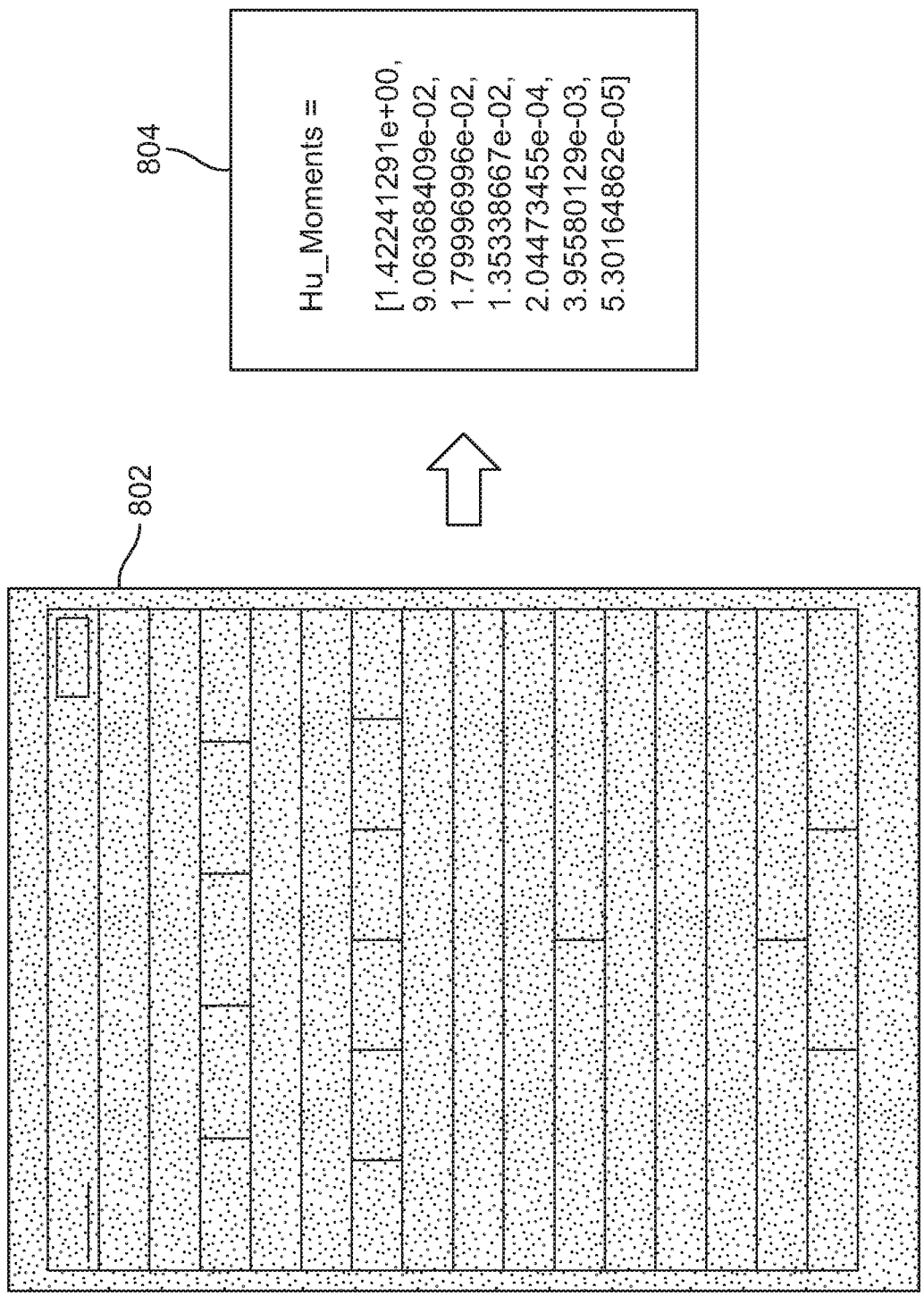
FIG. 8 is a depiction of an example template and a corresponding condensed representation of the template according to an embodiment.

FIG. 8 is a depiction of an example template and a corresponding condensed representation of the template according to an embodiment. As shown in FIG. 8, a template 802 may be represented as a corresponding condensed representation 804 of the template 802. As can be readily seen, template 802 is different from template 702, as are their associated corresponding condensed representations 804 and 704.

Figure 9A:
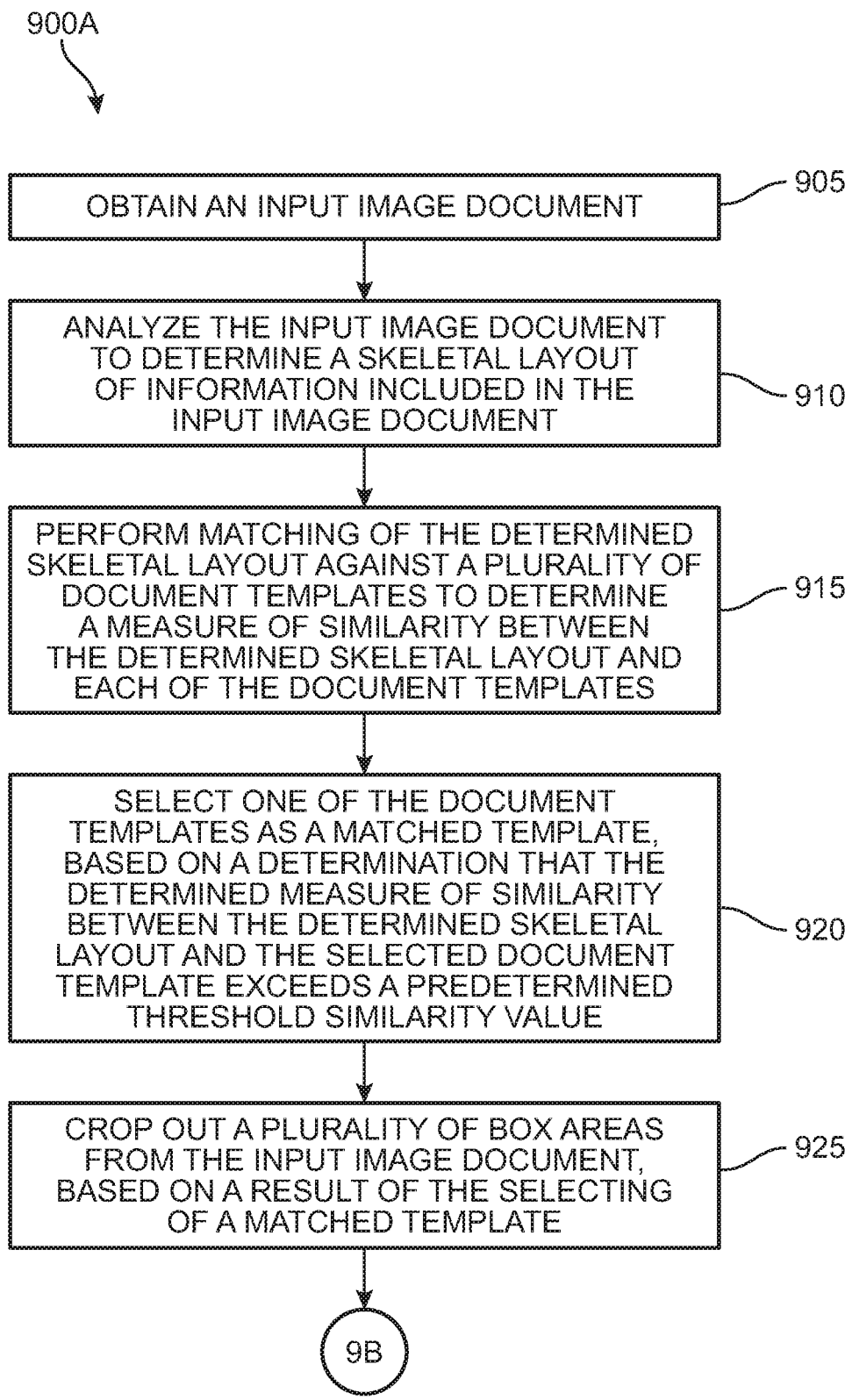
FIGS. 9A-9B are a flowchart illustrating a method for extracting structured information from image documents according to an embodiment.
Figure 9B:
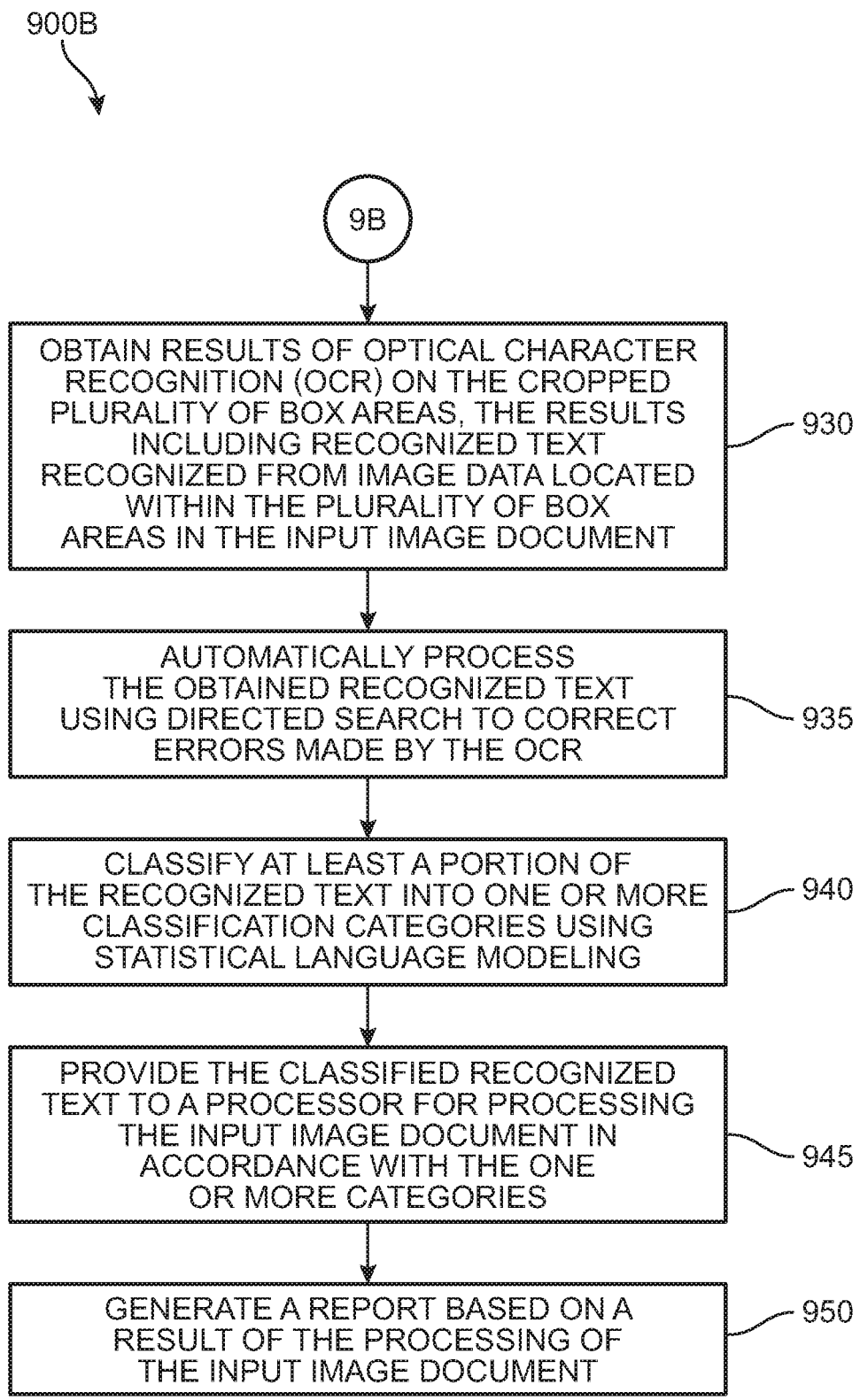

FIGS. 9A-9B are a flowchart of an example embodiment of a method of extracting structured information from image documents. For purposes of readability, the flowchart is divided into first portion of method 900A and second portion of method 900B. As shown in FIG. 9A, in step 905, an input image document may be obtained. In step 910, the input image document may be analyzed to determine a skeletal layout of information included in the input image document. In step 915, matching of the determined skeletal layout against a plurality of document templates may be performed to determine a measure of similarity between the determined skeletal layout and each of the document templates. In step 920, one of the document templates may be selected as a matched template, based on a determination that the determined measure of similarity between the determined skeletal layout and the selected document template exceeds a predetermined threshold similarity value. In step 925, a plurality of box areas may be cropped out from the input image document, based on a result of the selecting of a matched template.

As shown in FIG. 9B, in step 930, results of optical character recognition (OCR) on the cropped plurality of box areas may be obtained, the results including recognized text recognized from image data located within the plurality of box areas in the input image document. In step 935, the obtained recognized text may be automatically processed using directed search to correct errors made by the OCR. In step 940, at least a portion of the recognized text may be classified into one or more classification categories using statistical language modeling. In step 945, the classified recognized text may be provided to a processor for processing the input image document in accordance with the one or more categories. In step 945, a report may be generated based on a result of the processing of the input image document.

Implementations of the various techniques described herein may be implemented in digital electronic circuitry, or in computer hardware, firmware, software, or in combinations of them (e.g., an apparatus configured to execute instructions to perform various functionality).

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a non-transitory "computer-readable storage medium" or a "computer-readable storage device."

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor may receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

We claim:

1. A method of extracting structured information from image documents, the method comprising:
   obtaining an input image document including text;
   analyzing the input image document to determine a skeletal layout of information included in the input image document by removing the text from the input image document to determine the skeletal layout that includes a fingerprint of the input image document, wherein the fingerprint of the input image document includes a multi-dimensional feature vector representing boxes in the input image document;
   performing matching of the determined skeletal layout against a plurality of document templates to determine a measure of similarity between the determined skeletal layout and each of the document templates by:
      comparing the determined fingerprint of the input image document to a plurality of fingerprints including multi-dimensional feature vectors representing the plurality of document templates; and
      determining a measure of similarity between the fingerprint of the input image and the plurality of fingerprints representing the plurality of document templates by determining Euclidean distance between the multi-dimensional feature vectors of each;
   selecting one of the document templates as a matched template, based on a determination that the determined measure of similarity between the determined skeletal layout and the selected document template exceeds a predetermined threshold similarity value;
   cropping out a plurality of box areas from the input image document, based on a result of the selecting of a matched template;
   obtaining results of optical character recognition (OCR) on the cropped plurality of box areas, the results including recognized text recognized from image data located within the plurality of box areas in the input image document;
   automatically processing the obtained recognized text using directed search based on a list of historical OCR errors;
   correcting the errors found in the obtained recognized text by using the results of the directed search;
   classifying at least a portion of the recognized text into one or more classification categories using statistical language modeling;
   providing the classified recognized text to a processor for processing the input image document in accordance with the one or more categories; and
   generating a report based on a result of the processing of the input image document.

2. The method of claim 1, wherein the input image document includes an input image of a filled form.

3. The method of claim 1, further comprising:
   obtaining an annotated version of the input image document, based on a determination that the determined measure of similarity between the determined skeletal layout and each of the plurality of document templates does not exceed the predetermined threshold similarity value; and
   storing the annotated version in a template repository with the plurality of templates.

4. The method of claim 1, wherein obtaining the input image document includes obtaining the input image document via scanning.

5. The method of claim 1, wherein the input image document includes an image of a filled insurance form, wherein classifying the recognized text into one or more classification categories includes determining a type of accident associated with the filled insurance form, based on automatically analyzing the recognized text using at least natural language processing,
   wherein the processor for processing the input image document processes the input image document in accordance with the determined type of accident.

6. The method of claim 1, wherein removing text from the input image document includes using computer vision.

7. The method of claim 6, wherein the skeletal layout of information included in the input image document includes an arrangement of boxes within the input image document.

8. The method of claim 7, wherein the multi-dimensional feature vector of the fingerprint of the input image document and the multi-dimensional feature vectors of the plurality of document templates are all seven-dimensional vectors of real numbers.

9. The method of claim 8, wherein the seven-dimensional vectors of real numbers describe an outline of an object.

10. The method of claim 8, wherein the seven-dimensional vectors of real numbers are Hu Moments.

11. A non-transitory computer-readable medium storing software comprising instructions that are executable by one or more device processors to extract structured information from image documents by:
   obtaining an input image document including text;
   analyzing the input image document to determine a skeletal layout of information included in the input image document by removing the text from the input image document to determine the skeletal layout that includes a fingerprint of the input image document, wherein the fingerprint of the input image document includes a multi-dimensional feature vector representing boxes in the input image document;
   performing matching of the determined skeletal layout against a plurality of document templates to determine a measure of similarity between the determined skeletal layout and each of the document templates by:
      comparing the determined fingerprint of the input image document to a plurality of fingerprints including multi-dimensional feature vectors representing the plurality of document templates; and
      determining a measure of similarity between the fingerprint of the input image and the plurality of fingerprints representing the plurality of document templates by determining Euclidean distance between the multi-dimensional feature vectors of each;
   selecting one of the document templates as a matched template, based on a determination that the determined measure of similarity between the determined skeletal layout and the selected document template exceeds a predetermined threshold similarity value;
   cropping out a plurality of box areas from the input image document, based on a result of the selecting of a matched template;
   obtaining results of optical character recognition (OCR) on the cropped plurality of box areas, the results including recognized text recognized from image data located within the plurality of box areas in the input image document;
   automatically processing the obtained recognized text using directed search based on a list of historical OCR errors;

correcting the errors found in the obtained recognized text by using the results of the directed search;

classifying at least a portion of the recognized text into one or more classification categories using statistical language modeling;

providing the classified recognized text to a processor for processing the input image document in accordance with the one or more categories; and generating a report based on a result of the processing of the input image document.

12. The non-transitory computer-readable medium of claim 11, wherein the input image document includes an input image of a filled form and the structured information includes information previously entered in filling out the form.

13. The non-transitory computer-readable medium of claim 11, wherein the instructions are executable by the one or more device processors to:

obtain an annotated version of the input image document, based on a determination that the determined measure of similarity between the determined skeletal layout and each of the plurality of document templates does not exceed the predetermined threshold similarity value; and store the annotated version in a template repository with the plurality of templates.

14. The non-transitory computer-readable medium of claim 11, wherein removing text from the input image document includes using computer vision.

15. The non-transitory computer-readable medium of claim 14, wherein the skeletal layout of information included in the input image document includes an arrangement of boxes within the input image document.

16. The non-transitory computer-readable medium of claim 15, wherein the multi-dimensional feature vector of the fingerprint of the input image document and the multi-dimensional feature vectors of the plurality of document templates are all seven-dimensional vectors of real numbers.

17. A system for extracting structured information from image documents, the system comprising:

a device processor; and a non-transitory computer readable medium storing instructions that are executable by the device processor to:

obtain an input image document including text;

analyze the input image document to determine a skeletal layout of information included in the input image document by removing the text from the input image document to determine the skeletal layout that includes a fingerprint of the input image document, wherein the fingerprint of the input image document includes a multi-dimensional feature vector representing boxes in the input image document;

perform matching of the determined skeletal layout against a plurality of document templates to determine a measure of similarity between the determined skeletal layout and each of the document templates by:

compare the determined fingerprint of the input image document to a plurality of fingerprints including multi-dimensional feature vectors representing the plurality of document templates; and determine a measure of similarity between the fingerprint of the input image and the plurality of fingerprints representing the plurality of document templates by determining Euclidean distance between the multi-dimensional feature vectors of each;

select one of the document templates as a matched template, based on a determination that the determined measure of similarity between the determined skeletal layout and the selected document template exceeds a predetermined threshold similarity value;

crop out a plurality of box areas from the input image document, based on a result of the selecting of a matched template;

obtain results of optical character recognition (OCR) on the cropped plurality of box areas, the results including recognized text recognized from image data located within the plurality of box areas in the input image document;

automatically process the obtained recognized text using directed search based on a list of historical OCR errors;

correct the errors found in the obtained recognized text by using the results of the directed search;

classify at least a portion of the recognized text into one or more classification categories using statistical language modeling;

provide the classified recognized text to a processor for processing the input image document in accordance with the one or more categories; and generate a report based on a result of the processing of the input image document.

18. The system of claim 17, wherein
the instructions are executable by the device processor to:

automatically determine a new template for the input image document, based on a determination that the determined measure of similarity between the determined skeletal layout and each of the plurality of document templates does not exceed the predetermined threshold similarity value, wherein the automatically determining the new template includes utilizing historical data indicating structures of previously input image documents that are determined as having similar key values, based on natural language analysis; and store the new template in a template repository with the plurality of templates, the new template being based on the annotated version of the input image document.

19. The system of claim 17, wherein the skeletal layout of information included in the input image document includes an arrangement of boxes within the input image document.

20. The system of claim 18, wherein the multi-dimensional feature vector of the fingerprint of the input image document and the multi-dimensional feature vectors of the plurality of document templates are all seven-dimensional vectors of real numbers.

* * * * *